US008885221B2

(12) United States Patent
Tanaka

(10) Patent No.: US 8,885,221 B2
(45) Date of Patent: Nov. 11, 2014

(54) IMAGE PROCESSING APPARATUS AND METHOD THEREOF

(75) Inventor: Shoji Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 13/188,221

(22) Filed: Jul. 21, 2011

(65) Prior Publication Data
US 2012/0050814 A1 Mar. 1, 2012

(30) Foreign Application Priority Data

Aug. 25, 2010 (JP) ................. 2010-188747

(51) Int. Cl.
G06F 3/12 (2006.01)
G06K 15/00 (2006.01)
G03F 3/08 (2006.01)
G06K 9/54 (2006.01)
G06K 9/32 (2006.01)
H04N 1/405 (2006.01)

(52) U.S. Cl.
CPC .................. *H04N 1/4052* (2013.01)
USPC .......... 358/3.03; 358/1.9; 358/1.16; 358/518; 358/523; 358/1.13; 382/275; 382/237; 382/260

(58) Field of Classification Search
USPC ........ 358/1.9, 518, 3.06, 1.13, 2.1, 3.03, 466, 358/534; 382/237
See application file for complete search history.

(56) References Cited

U.S. PATENT DOCUMENTS

| | | | | |
|---|---|---|---|---|
| 5,621,545 A | * | 4/1997 | Motta et al. | 358/518 |
| 5,739,917 A | * | 4/1998 | Shu et al. | 358/2.1 |
| 5,748,785 A | * | 5/1998 | Mantell et al. | 382/237 |
| 6,175,424 B1 | * | 1/2001 | Iino et al. | 358/1.9 |
| 6,282,325 B1 | | 8/2001 | Han | |
| 6,330,075 B1 | * | 12/2001 | Ishikawa | 358/1.9 |
| 6,967,745 B1 | | 11/2005 | Konno | |
| 7,940,427 B2 | | 5/2011 | Takemura et al. | |
| 8,009,327 B2 | | 8/2011 | Ishikawa | |
| 2001/0028466 A1 | * | 10/2001 | Kobayashi | 358/1.9 |
| 2007/0058202 A1 | * | 3/2007 | Kakutani | 358/3.06 |

(Continued)

FOREIGN PATENT DOCUMENTS

| | | |
|---|---|---|
| CN | 1230844 | 10/1999 |
| CN | 1906923 | 1/2007 |

(Continued)

OTHER PUBLICATIONS

European Search Report dated Dec. 16, 2011, issued during prosecution of related European application No. 11178315.5.

(Continued)

*Primary Examiner* — Akwasi M Sarpong
(74) *Attorney, Agent, or Firm* — Fitzpatrick, Cella, Harper & Scinto

(57) ABSTRACT

Error diffusion processing is performed for each pixel in each region of an image divided into a plurality of regions, by scanning in both the first and second directions different to each other. A diffusion coefficient set for diffusing, to the pixel of interest to be processed, a quantization error generated upon quantizing a pixel near the pixel of interest is set in accordance with the position of the pixel of interest in scanning in the first direction in the region of interest. The pixel of interest to which an error has been diffused from a pixel position referring to the set diffusion coefficient set is quantized.

18 Claims, 13 Drawing Sheets

(56) References Cited

U.S. PATENT DOCUMENTS

| | | | |
|---|---|---|---|
| 2008/0137145 A1 | 6/2008 | Takemura et al. | |
| 2009/0059303 A1* | 3/2009 | Miyazaki | 358/3.03 |
| 2009/0310161 A1* | 12/2009 | Kawamura | 358/1.9 |
| 2010/0141972 A1* | 6/2010 | Yanai | 358/1.9 |
| 2011/0164829 A1* | 7/2011 | Moribe | 382/275 |

FOREIGN PATENT DOCUMENTS

| | | |
|---|---|---|
| CN | 101052091 | 10/2007 |
| CN | 101150736 | 3/2008 |
| EP | 0 889 642 | 1/1999 |
| EP | 2 214 395 | 8/2010 |
| JP | 63-309458 | 12/1988 |
| JP | 63-310269 | 12/1988 |
| JP | 6-91606 | 11/1994 |
| JP | 8-228285 | 9/1996 |
| JP | 9-135351 | 5/1997 |
| JP | 3004628 | 11/1999 |
| JP | 3733826 | 10/2005 |

OTHER PUBLICATIONS

U.S. Appl. No. 13/208,716, filed Aug. 12, 2011.
Chinese Office Action dated Sep. 4, 2013, issued during prosecution of a Chinese application No. 201110249581.9, which is a counterpart application of related co-pending U.S. Appl. No. 13/208,716. (Whole English-language translation of Office Action is included).
Office Action dated Mar. 26, 2014 in U.S. Appl. No. 13/208,716.
Japanese Office Action dated Jul. 14, 2014 issued during prosecution of related Japanese application No. 2010-188747.

* cited by examiner

FIG. 2A

|   | 3 / 16 |
|---|---|
| * | 5 / 16 |
| 7 / 16 | 1 / 16 |

FIG. 2B

| 7 / 16 | 1 / 16 |
|---|---|
| * | 5 / 16 |
|   | 3 / 16 |

FIG. 2C

| a | d | f |
|---|---|---|
| b | * | g |
| c | e | h |

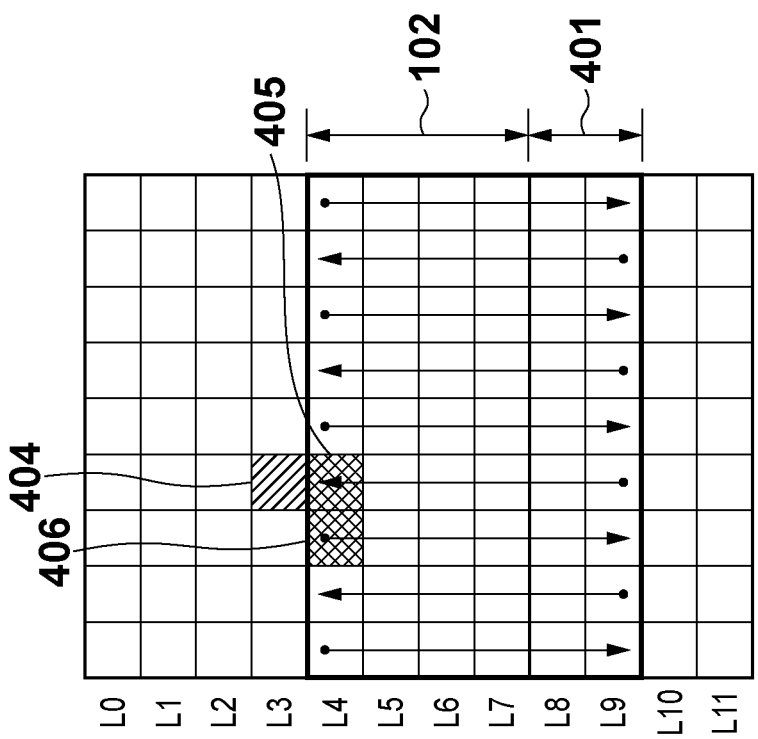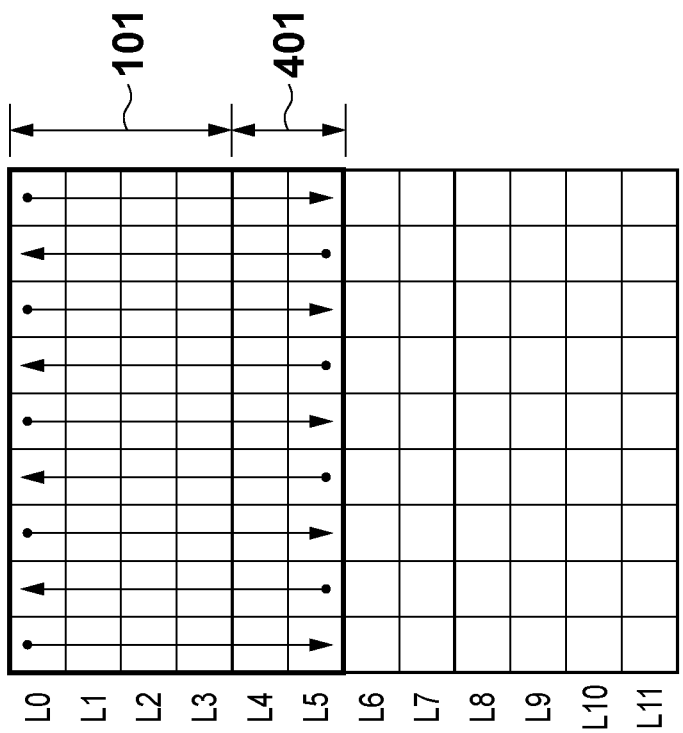
FIG. 3A
FIG. 3B

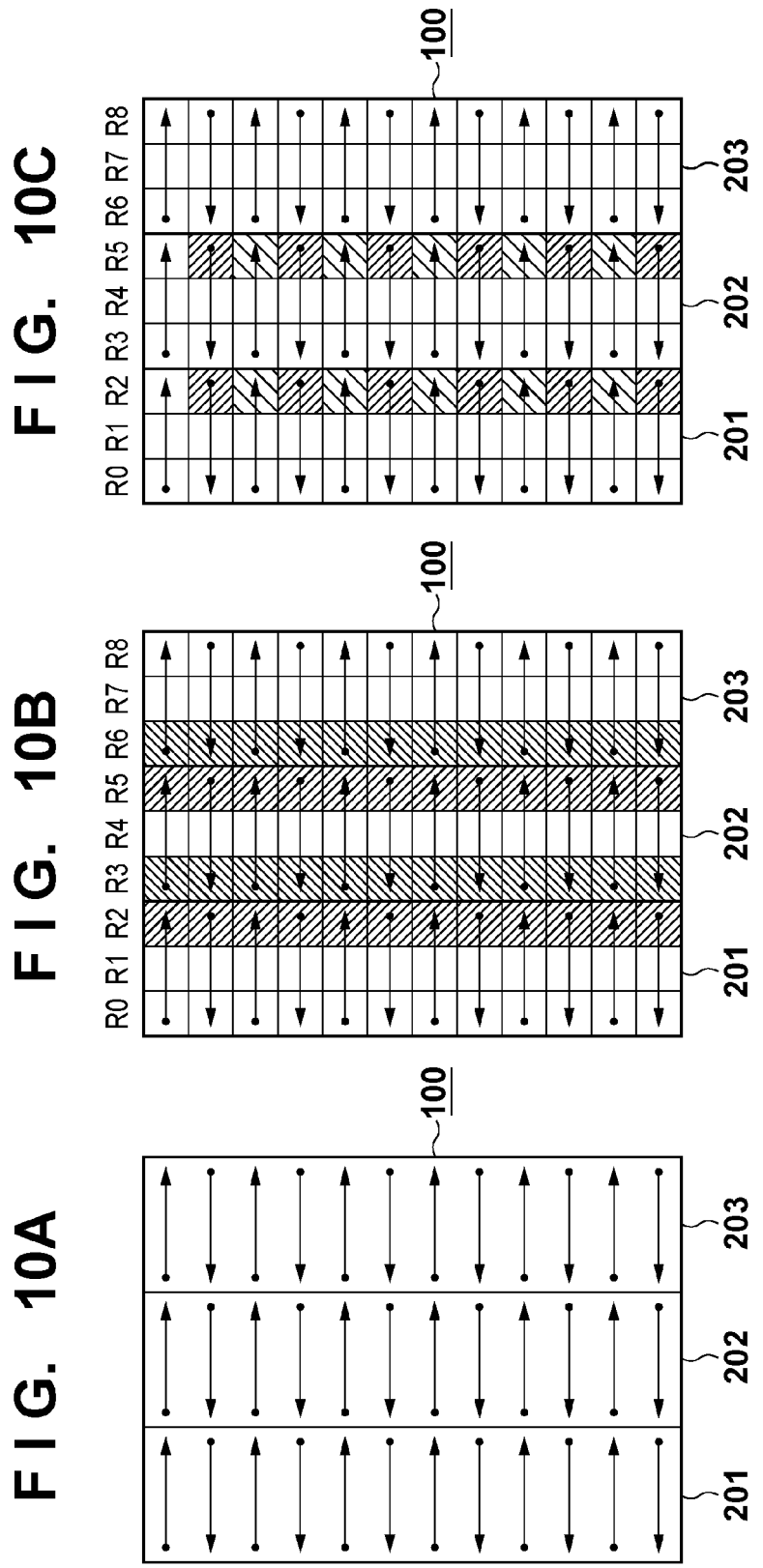

FIG. 11A
|   | * | 7/16 |
|---|---|------|
| 3/16 | 5/16 | 1/16 |
FIG. 11B
| 7/16 | * |   |
|------|---|---|
| 1/16 | 5/16 | 3/16 |
FIG. 11C
| a | d | f |
|---|---|---|
| b | * | g |
| c | e | h |
FIG. 11D
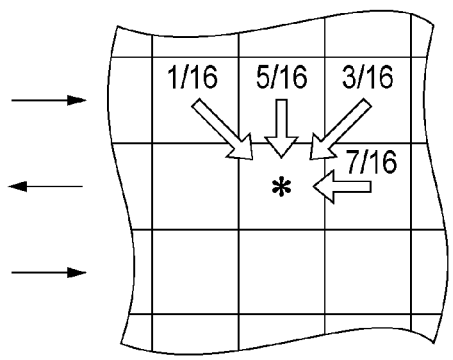
FIG. 11E
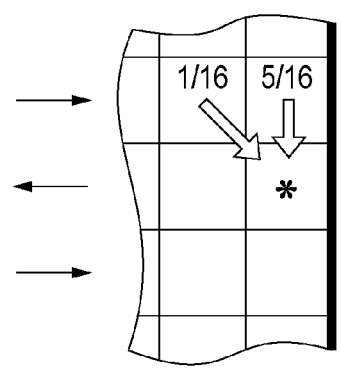
FIG. 11F
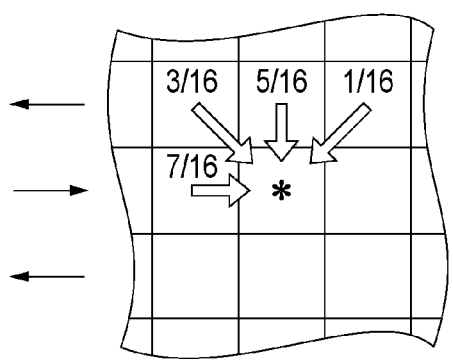
FIG. 11G
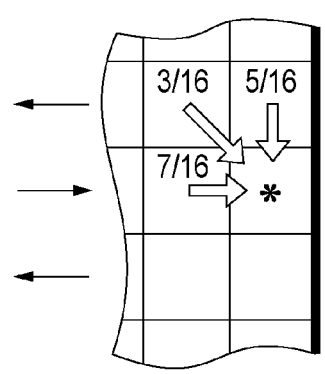

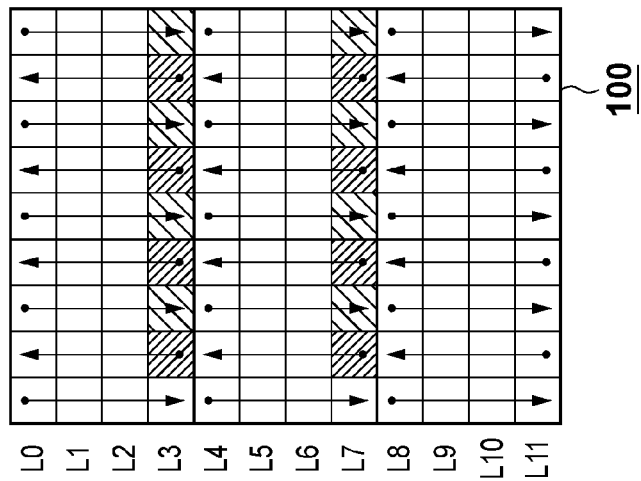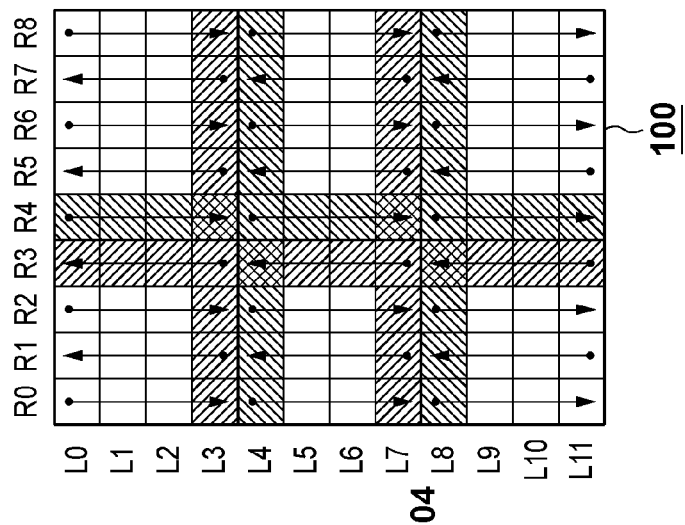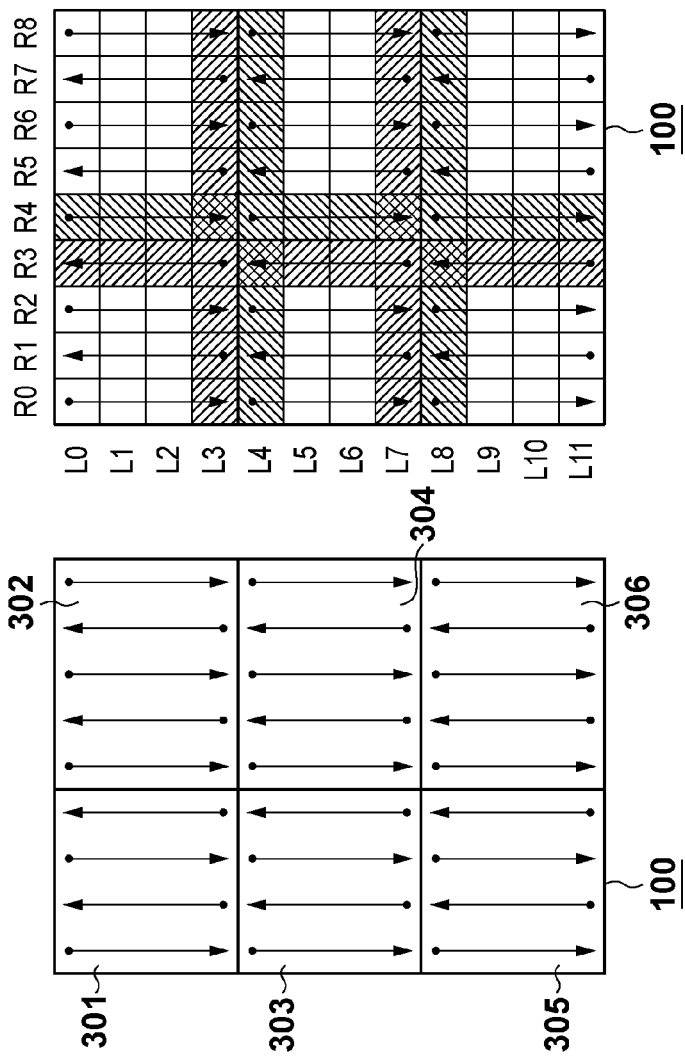

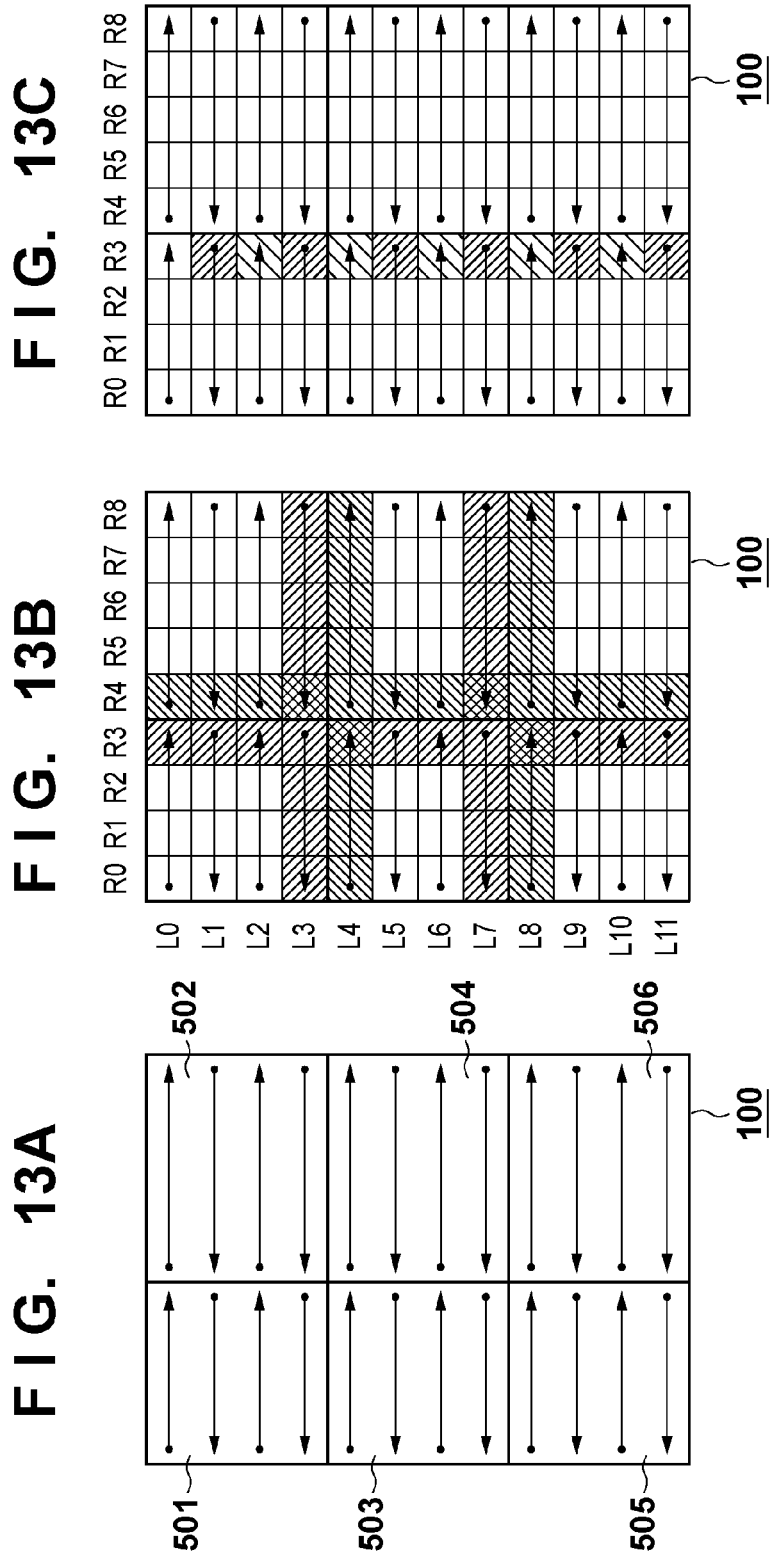

IMAGE PROCESSING APPARATUS AND METHOD THEREOF

BACKGROUND OF THE INVENTION

1. Field of the Invention

The present invention relates to error diffusion processing for an image.

2. Description of the Related Art

An image output apparatus which can express only two tones by ON/OFF of a dot per pixel, like an inkjet printer, expresses a multi-tone image by performing halftone processing for multi-tone image data. The halftone processing is image processing for pseudo-expressing multiple tones using a small number of tones such as two tones. Halftone processing is achieved by various methods. Among them, an error diffusion method is most popular because of excellent tonality and high resolution of a processed image. The error diffusion method is image processing of sequentially diffusing the difference (quantization error) between a pixel value before quantization and one after quantization in the pixel of interest to unprocessed pixels around the pixel of interest at predetermined ratios.

When processing image data, it needs to be developed in the memory. In terms of the cost, it is difficult to equip a device with a memory having a storage capacity capable of developing all image data of one image, especially for low-end devices such as a home printer. Under the circumstances, an image is divided into a plurality of partial regions, and the partial regions are developed one by one in the memory and undergo image processing.

Another factor that raises the cost of a device is increasing storage capacity of a memory for delay along with a recent increase in resolution of image data to be processed. As a solution to this problem, for example, in an invention disclosed in Japanese Patent No. 3733826 (patent literature 1), an image is divided into a plurality of bands, and image processing is performed by scanning them in a direction perpendicular to the band division direction. This implements an image processing apparatus in which the storage capacity of the memory for delay depends not on the resolution of image data to be processed but on the band height.

However, the image quality sometimes degrades when an image is divided into a plurality of regions and halftone processing is performed using the error diffusion method. More specifically, no error is diffused from a given region to the next one, and the continuity of error diffusion processing is lost at the boundary between the regions. This results in a dot pattern mismatch at the boundary between the regions. The dot pattern mismatch at the boundary between the regions is observed as a thread, which is visually conspicuous image quality degradation.

A method for solving this problem is, for example, a technique disclosed in an invention in Japanese Patent Laid-Open No. 63-310269 (patent literature 2). According to this technique, an error (diffusion error) diffused when a pixel near the boundary of a region was processed is stored in a memory. The diffusion error stored in the memory is used when processing a pixel near the boundary of a region to be processed next. This invention discloses a method of setting an overlapping region for error diffusion processing near the boundary and approximating an error to be diffused to a pixel near the boundary of the region. However, even the invention in patent literature 2 cannot accurately approximate an error to be diffused to a pixel near the boundary.

An example in which an image is divided into bands and error diffusion processing is performed will be explained with reference to FIG. 1. An image 100 is divided into bands 101, 102, and 103. Error diffusion processing is done by alternately scanning pixels in a direction (top-to-bottom direction in FIG. 1) that is perpendicular to the longitudinal direction of the band. This scanning can prevent one-sided diffusion of an error, improving the image quality.

FIGS. 2A and 2B exemplify error diffusion matrices. FIG. 2A shows an error diffusion matrix when scanning a band downward. The quantization error of the pixel of interest indicated by "*" is diffused to the next pixel of interest (lower pixel) at a ratio of 7/16, and three adjacent pixels on the next row at ratios of 3/16, 5/16, and 1/16 from the top. FIG. 2B shows an error diffusion matrix when scanning a band upward. The quantization error of the pixel of interest is diffused to the next pixel of interest (upper pixel) at a ratio of 7/16, and three adjacent pixels on the next row at ratios of 1/16, 5/16, and 3/16 from the top.

An example in which an overlapping region is set and error diffusion processing is performed for a band image will be explained with reference to FIGS. 3A and 3B. As shown in FIG. 3A, for example, a two-pixel wide overlapping region 401 is set in a band 102 in error diffusion processing for a band 101. A pixel at the upper left corner (leftmost end of line L0) of the band 101 is set as the pixel of interest. Pixels are scanned down to perform error diffusion processing until a pixel at the left end of line L5 serves as the pixel of interest. Then, a pixel on the second row of line L5 is set as the pixel of interest. Pixels are scanned up to perform error diffusion processing until a pixel on the second row of line L0 serves as the pixel of interest. Scanning is alternately repeated till the final row, and error diffusion processing for the band 101 ends. After the end of error diffusion processing for the band 101, error diffusion processing is done for the band 102 and the two-pixel wide overlapping region 401 of a band 103 as a processing target region, as shown in FIG. 3B. The same processing is repeated till a band at the bottom.

This error diffusion processing diffuses the quantization error of the pixel of interest to pixels e, f, g, and h shown in FIG. 2C at ratios of 7/16, 3/16, 5/16, and 1/6 in processing an odd-numbered row. Also, the error diffusion processing diffuses the quantization error of the pixel of interest to pixels d, f, g, and h at ratios of 7/16, 1/16, 5/16, and 3/6 in processing an even-numbered row.

In error diffusion processing for the band 101, errors (to be referred to as a diffusion error A) are diffused from pixels 406 and 405 on boundary line L4 of the band 102 to a pixel 404 of interest on an even-numbered row on boundary line L3 of the band 101 shown in FIG. 3B. In error diffusion processing for the band 102, errors (to be referred to as a diffusion error B) are diffused from the pixels 406 and 405 to the pixel 404 of interest (though these errors are not diffused actually). No dot pattern mismatch occurs if the values of the diffusion errors A and B are approximate to each other.

In error diffusion processing for the band 101, the diffusion error A actually diffused from the pixels 406 and 405 to the pixel 404 of interest is affected by the quantization error of line L5 of the overlapping region 401 because of bidirectional pixel scanning. In error diffusion processing for the band 102, the diffusion error B which is not actually diffused from the pixels 406 and 405 to the pixel 404 of interest is affected by the quantization error of line L5 and further by the quantization error of a lower line. In general, therefore, the values of the diffusion errors A and B are not approximate to each other. The invention in patent literature 2 is free from this problem because error diffusion processing is performed by scanning pixels only downward.

When error diffusion processing is executed by scanning a band in two directions perpendicular to its longitudinal direction, even the arranged overlapping region cannot prevent thread-like image quality degradation at the boundary. Arranging an overlapping region requires a larger capacity of memory storage, and increases the calculation amount and installation cost.

SUMMARY OF THE INVENTION

In one aspect, a method of performing error diffusion processing for each pixel in each region of an image divided into a plurality of regions, by scanning in both a first direction and second direction different to each other, comprising the steps of: setting a diffusion coefficient set for diffusing, to a pixel of interest to be processed, a quantization error generated upon quantizing a pixel near the pixel of interest, in accordance with a position of the pixel of interest in scanning in the first direction in a region of interest; and quantizing the pixel of interest to which an error has been diffused from a pixel position referring to the diffusion coefficient set that has been set in the setting step.

In another aspect, a method of performing error diffusion processing by scanning a pixel of interest in one of lateral and longitudinal directions in each region of an image divided into a plurality of regions, to make a scanning direction of a pixel on one of an odd-numbered line and an odd-numbered row and a scanning direction of a pixel on one of an even-numbered line and an even-numbered row opposite to each other, comprising the steps of: setting a diffusion coefficient set for diffusing, to the pixel of interest, a quantization error generated upon quantizing a pixel near the pixel of interest, in accordance with a position of the pixel of interest in a current processing region in the error diffusion processing; quantizing the pixel of interest to which the quantization error has been added in accordance with the diffusion coefficient set; and storing a quantization error of the pixel of interest in a first memory for referring to a quantization error in the error diffusion processing for the current processing region, and storing the quantization error of the pixel of interest in a memory area corresponding to the position of the pixel of interest in a second memory for referring to a quantization error in the error diffusion processing for an un-processing region to be processed after processing the current processing region.

According to these aspects, degradation of the image quality at the boundary of a divided region can be reduced when performing error diffusion processing for each divided region of an image.

Further features of the present invention will become apparent from the following description of exemplary embodiments with reference to the attached drawings.

BRIEF DESCRIPTION OF THE DRAWINGS

FIGS. 2A to 2C are views each exemplifying an error diffusion matrix.

FIGS. 3A and 3B are views for explaining an example in which an overlapping region is set and error diffusion processing is performed for a band image.

FIGS. 10A to 10C are views for explaining region division in the second embodiment.

FIGS. 11A to 11G are views for explaining examples of error diffusion matrices and the quantization error diffusion amount.

FIGS. 12A to 12C are views for explaining region division in the third embodiment.

FIGS. 13A to 13C are views for explaining region division in the fourth embodiment.

DESCRIPTION OF THE EMBODIMENTS

Image processing according to preferred embodiments of the present invention will be described in detail with reference to the accompanying drawings. In image processing to be described below, an image is divided into a plurality of band-like regions in the sub-scanning direction (longitudinal direction) or main scanning direction (lateral direction). Error diffusion processing is performed by scanning the pixel of interest in each divided region in a direction perpendicular to the region division boundary so that the scanning direction of pixels on an odd-numbered line or odd-numbered row and that of an even-numbered line or even-numbered row become opposite to each other (to be referred to as reciprocated scanning). An image can also be divided into tiles or blocks in the longitudinal and lateral directions. In this case, error diffusion processing is done by reciprocally scanning each divided region in the lateral or longitudinal direction of the region in image processing to be described below.

First Embodiment

Apparatus Arrangement

Figure 4:
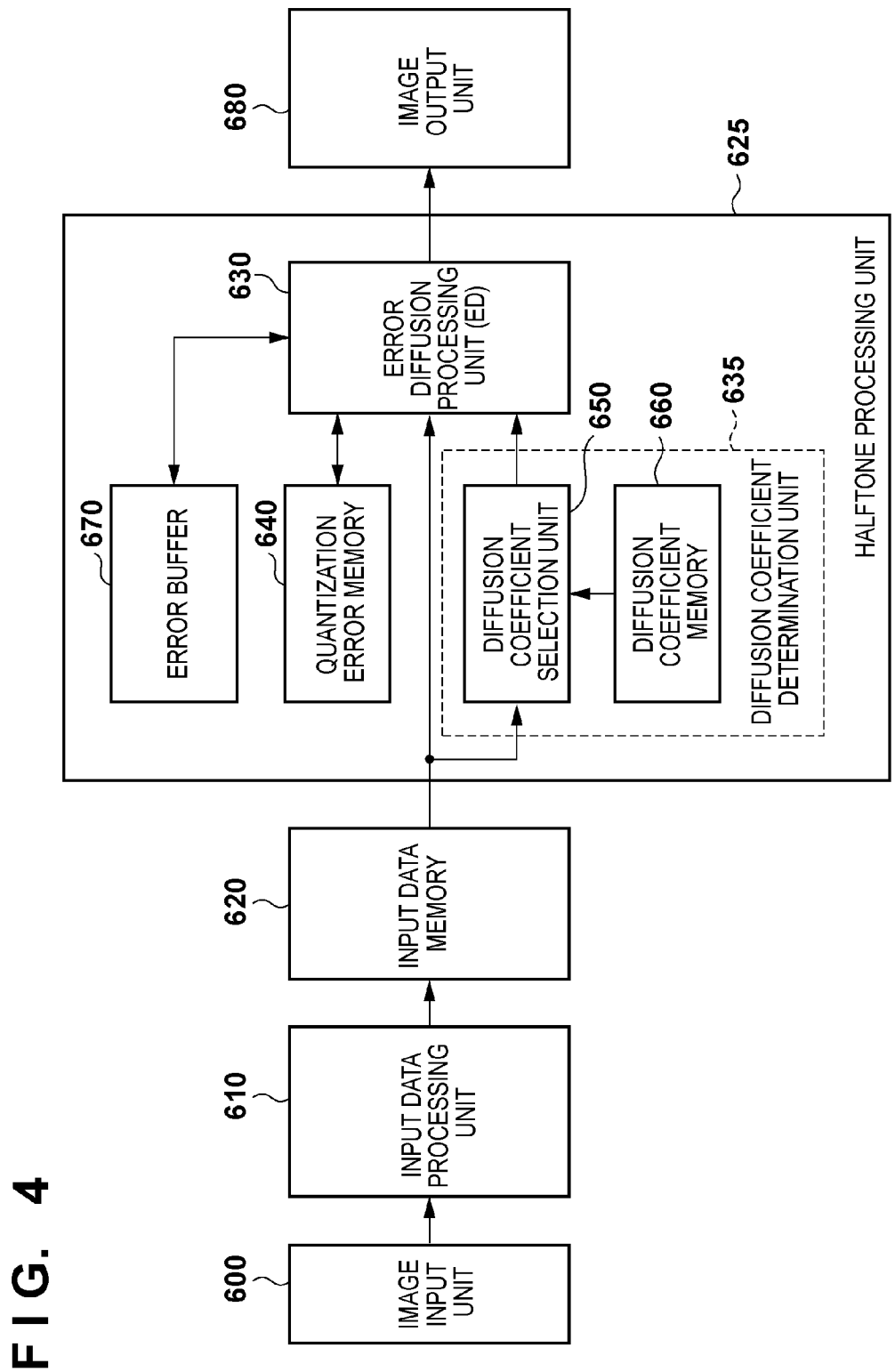
FIG. 4 is a block diagram for explaining the arrangement of an image processing apparatus according to an embodiment.

The arrangement of an image processing apparatus according to the first embodiment will be exemplified with reference to the block diagram of FIG. 4. An image input unit 600 is, for example, a scanner, and outputs image data obtained by converting an RGB analog signal of a read document image into a digital signal. An input data processing unit 610 controls the image input unit 600, and inputs image data for each region obtained by dividing a document image into a plurality of regions. An input data memory 620 is a memory with a storage capacity capable of holding image data of each divided region.

More specifically, the input data processing unit 610 develops the image of each divided region in the input data memory 620, and executes image processes such as luminance-density conversion, masking, undercolor removal, and gamma correction. After the end of error diffusion processing by a halftone processing unit 625 for the region developed in the input data memory 620, the image of the next divided region is overwritten in the input data memory 620.

The halftone processing unit 625 generates a halftone image at the number of tones processible by an image output unit 680. For example, when the image output unit 680 can express only two tones, the halftone processing unit 625 binarizes a continuous tone image into a binary image, and outputs the binary image.

In the halftone processing unit 625, an error diffusion processing unit (ED) 630 quantizes each pixel of an input image using a predetermined threshold, and calculates a quantization error.

A quantization error memory 640 holds a quantization error. A method of holding the quantization error of each pixel, adding a diffusion error calculated from the quantization error of a processed pixel and the value of the pixel of interest, and quantizing the pixel of interest will be explained. However, the image processing apparatus may employ a method of holding a diffusion error calculated from a quantization error for each pixel at the error diffusion destination, adding the diffusion error and the value of the pixel of interest, and quantizing the pixel of interest.

An error buffer 670 is configured to hold a quantization error to be spread between regions. The error buffer 670 holds a quantization error to be diffused to the next processing region (to be referred to as the next region) which has not been processed and is adjacent to the current processing region (to be referred to as the region of interest) out of divided regions. The image output unit 680 is, for example, a printer engine having an inkjet printhead. The image output unit 680 prints, on printing paper, an image represented by image data input from the halftone processing unit 625.

The quantization error memory 640 is the first memory which holds a quantization error to refer to it in error diffusion processing for the region of interest. The error buffer 670 is the second memory which holds a quantization error to refer to it in error diffusion processing for the next region.

A diffusion coefficient memory 660 in a diffusion coefficient setting unit 635 holds error diffusion matrices as shown in FIGS. 2A and 2B. A diffusion coefficient selection unit 650 selects an appropriate one of diffusion coefficient sets held in the diffusion coefficient memory 660 in accordance with the pixel scanning direction and the position of the pixel of interest. The diffusion coefficient selection unit 650 sets the selected diffusion coefficient set in the error diffusion processing unit 630.

The diffusion coefficient memory 660 holds diffusion coefficient sets corresponding to the error diffusion matrices shown in FIGS. 2A and 2B and the like. The error diffusion matrices shown in FIGS. 2A and 2B indicate pixels (to be referred to as diffusion destination pixels) to which the quantization error of the pixel of interest is diffused, and ratios of diffusion to the diffusion destination pixels. The diffusion coefficient memory 660 holds diffusion coefficient sets used to add quantization errors from quantized pixels (to be referred to as diffusion source pixels) when the pixel of interest is a diffusion destination pixel. That is, the diffusion coefficient set held in the diffusion coefficient memory 660 is an error diffusion matrix for diffusing a quantization error to the pixel of interest when a pixel near the pixel of interest was quantized.

[Image Processing]

Figure 1:
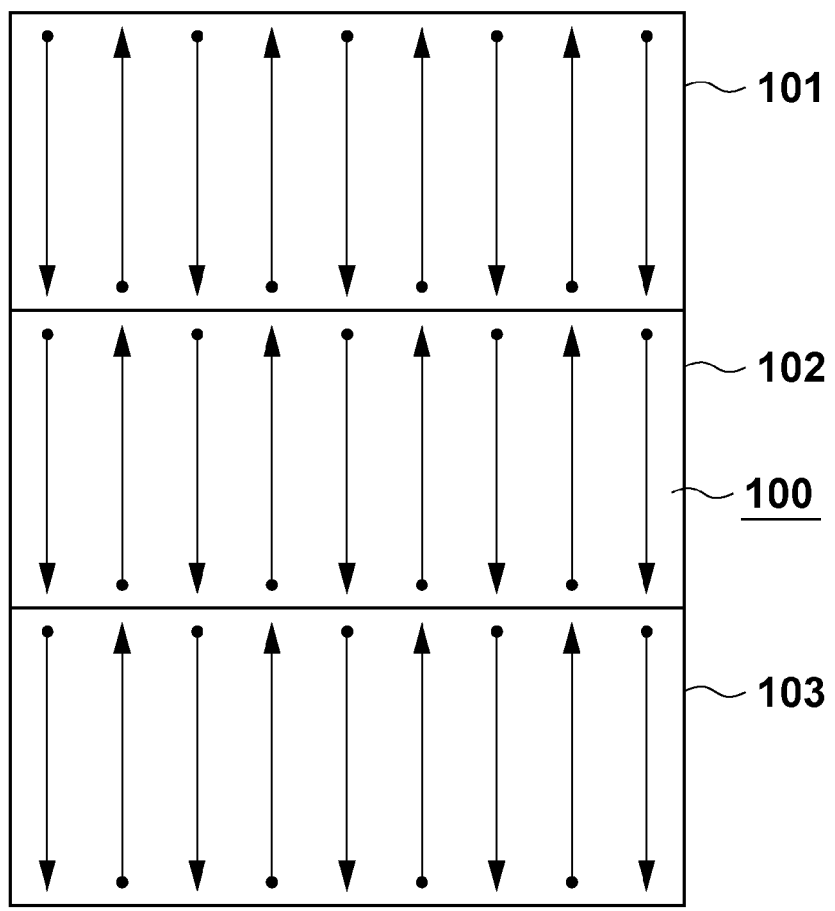
FIG. 1 is a view for explaining an example in which an image is divided into bands and error diffusion processing is performed.

The image processing apparatus according to the embodiment divides an image into a plurality of bands (regions) and performs error diffusion processing by reciprocally scanning the band, as shown in FIG. 1. The image of a band 101 is developed in the input data memory 620. After the end of error diffusion processing for the band 101, the image of a band 102 is overwritten in the input data memory 620.

The height (number of pixels) of the band need not always be equal between bands and may differ between them. In other words, the maximum band height is determined by the width of a document image and the storage capacity of the input data memory 620. The band height is arbitrary as long as it does not exceed the maximum height.

The image processing apparatus according to the embodiment achieves continuous error diffusion processing even at the boundary of a band by holding, in the error buffer 670, an undiffused quantization error generated in error diffusion processing for the region of interest and diffusing it to the next region.

Figure 5:
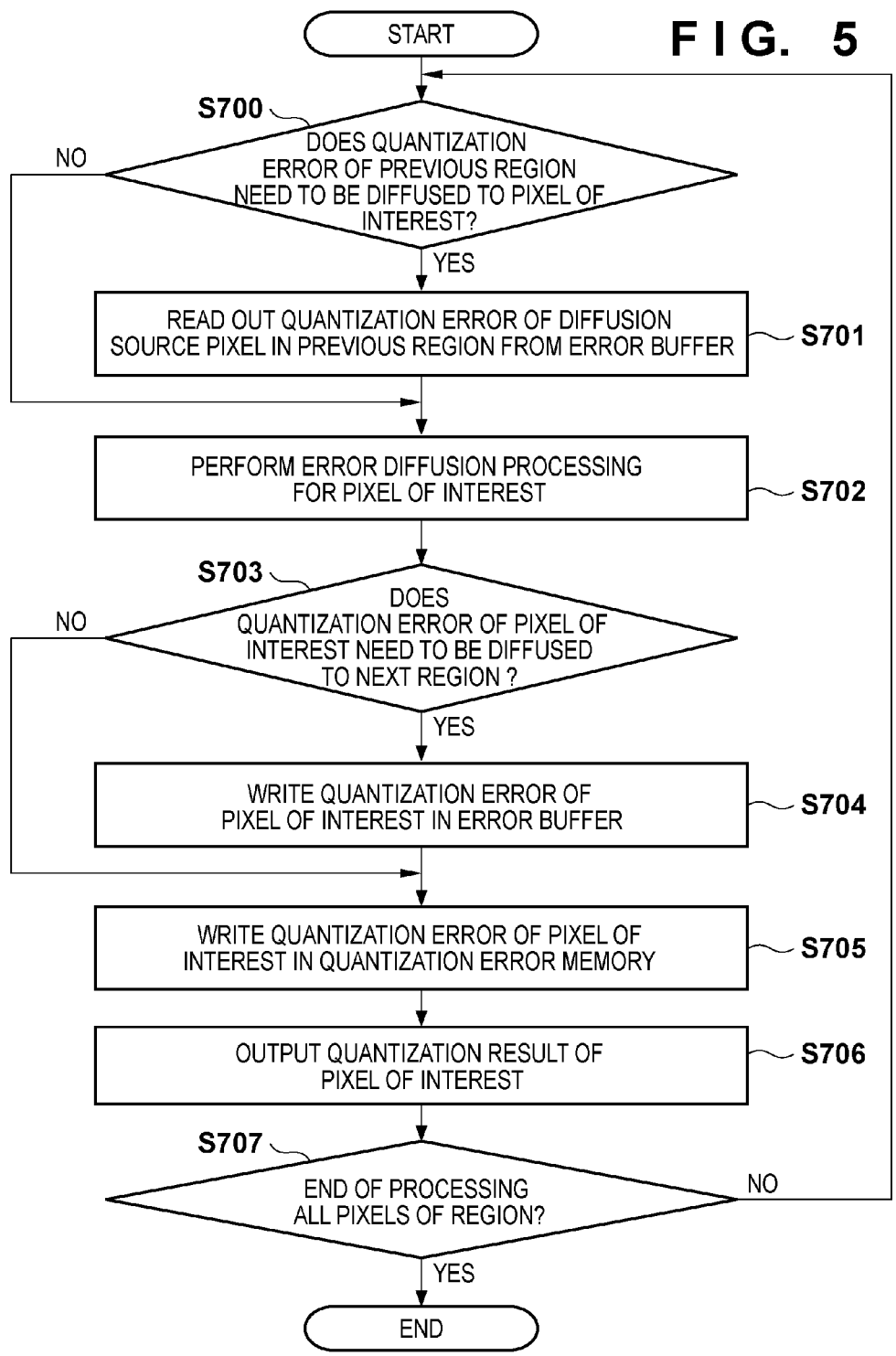
FIG. 5 is a flowchart for explaining error diffusion processing according to the embodiment.

Error diffusion processing according to the first embodiment will be explained with reference to the flowchart of FIG. 5. The ED 630 determines whether the pixel of interest is a pixel to which a quantization error in an adjacent previous processing region (to be referred to as a previous region) having undergone processing needs to be diffused (step S700).

Determination of whether the pixel of interest is a pixel to which a quantization error in a previous region needs to be diffused will be explained with reference to FIG. 6. When the pixel of interest is positioned on an even-numbered row on boundary line L4 of the band 102, quantization errors are diffused to the pixel of interest from three pixels a, b, and c on the left row shown in FIG. 2C and pixel e on the lower line. Since pixel a is not contained in the band 102 currently developed in the input data memory 620, the quantization error of pixel a held in the error buffer 670 needs to be referred to.

When the pixel of interest is positioned on an odd-numbered row on line L4, quantization errors are diffused to the pixel of interest from three pixels a, b, and c on the left row and pixel d on the upper line. Since pixels a and d are not contained in the band 102 currently developed in the input data memory 620, the quantization errors of pixels a and d held in the error buffer 670 need to be referred to.

In the use of the error diffusion matrices shown in FIGS. 2A and 2B, quantization errors in a previous region need to be diffused to pixels on line L4. However, pixels to which quantization errors in a previous region need to be diffused are not always those on line L4 depending on the error diffusion matrix.

If the ED 630 determines that the pixel of interest is a pixel to which a quantization error in a previous region needs to be diffused, it reads out the quantization error of a diffusion source pixel in the previous region from the error buffer 670 (step S701). The ED 630 performs error diffusion processing for the pixel of interest (step S702). The pixel of interest for which it is determined that a quantization error in a previous region needs to be diffused undergoes error diffusion processing using the quantization error of a diffusion source pixel in the previous region and the quantization error of a diffusion source pixel in the region of interest that is held in the quantization error memory 640. The pixel of interest for which it is determined that no quantization error in a previous region need be diffused undergoes error diffusion processing using the quantization error of a diffusion source pixel in the region of interest that is held in the quantization error memory 640.

Then, the ED 630 determines whether the pixel of interest is a pixel which needs to diffuse a quantization error to the next region (step S703).

Figure 6:
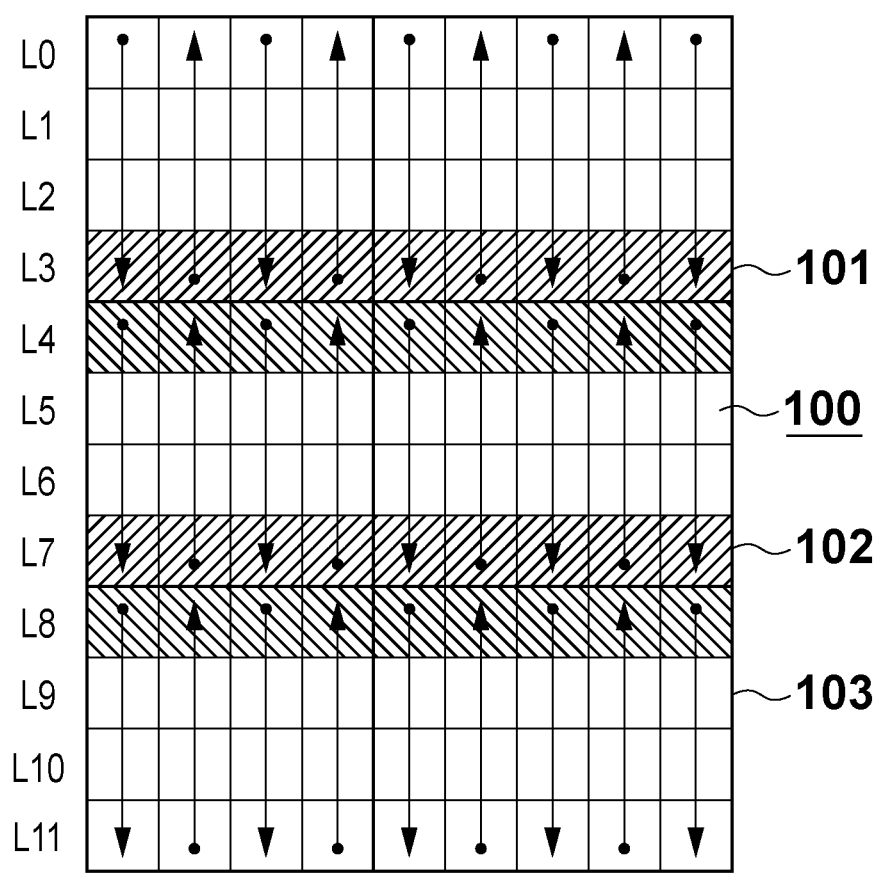
FIG. 6 is a view for explaining determination of whether the pixel of interest is a pixel to which a quantization error in a previous region needs to be diffused.

In FIG. 6, when the pixel of interest is positioned on an even-numbered row on boundary line L3 of the band 101, the quantization error of the pixel of interest is diffused to three pixels f, g, and h on the right row shown in FIG. 2C and pixel d on the upper line. Since pixel h is not contained in the band 101 currently developed in the input data memory 620, the error buffer 670 needs to hold the quantization error of the pixel of interest.

When the pixel of interest is positioned on an odd-numbered row on boundary line L3 of the band 101, the quantization error of the pixel of interest is diffused to three pixels f, g, and h on the right row and pixel e on the lower line. Since pixels e and h are not contained in the band 101 currently developed in the input data memory 620, the error buffer 670 needs to hold the quantization error of the pixel of interest.

In the use of the error diffusion matrices shown in FIGS. 2A and 2B, quantization errors need to be diffused to pixels on line L3 in the next region. However, pixels which need to diffuse quantization errors to the next region are not always those on line L3 depending on the error diffusion matrix.

If the ED 630 determines that the pixel of interest is a pixel which needs to diffuse a quantization error to the next region, it writes the quantization error of the pixel of interest in the error buffer 670 (step S704). Subsequently, the ED 630 writes the quantization error of the pixel of interest in the quantization error memory 640 (step S705). The quantization error of the pixel of interest for which it is determined that its quantization error needs to be diffused to the next region is written in the error buffer 670 and quantization error memory 640. The quantization error of the pixel of interest for which it is determined that its quantization error need not be diffused to the next region is written in the quantization error memory 640.

The ED 630 outputs the quantization result of the pixel of interest (step S706). The ED 630 determines whether all the pixels of the region developed in the input data memory 620 have been processed (step S707). If not all the pixels have been processed, the process returns to step S700 to repeat the processes in steps S700 to S706.

[Error Diffusion Processing]

Figure 7:
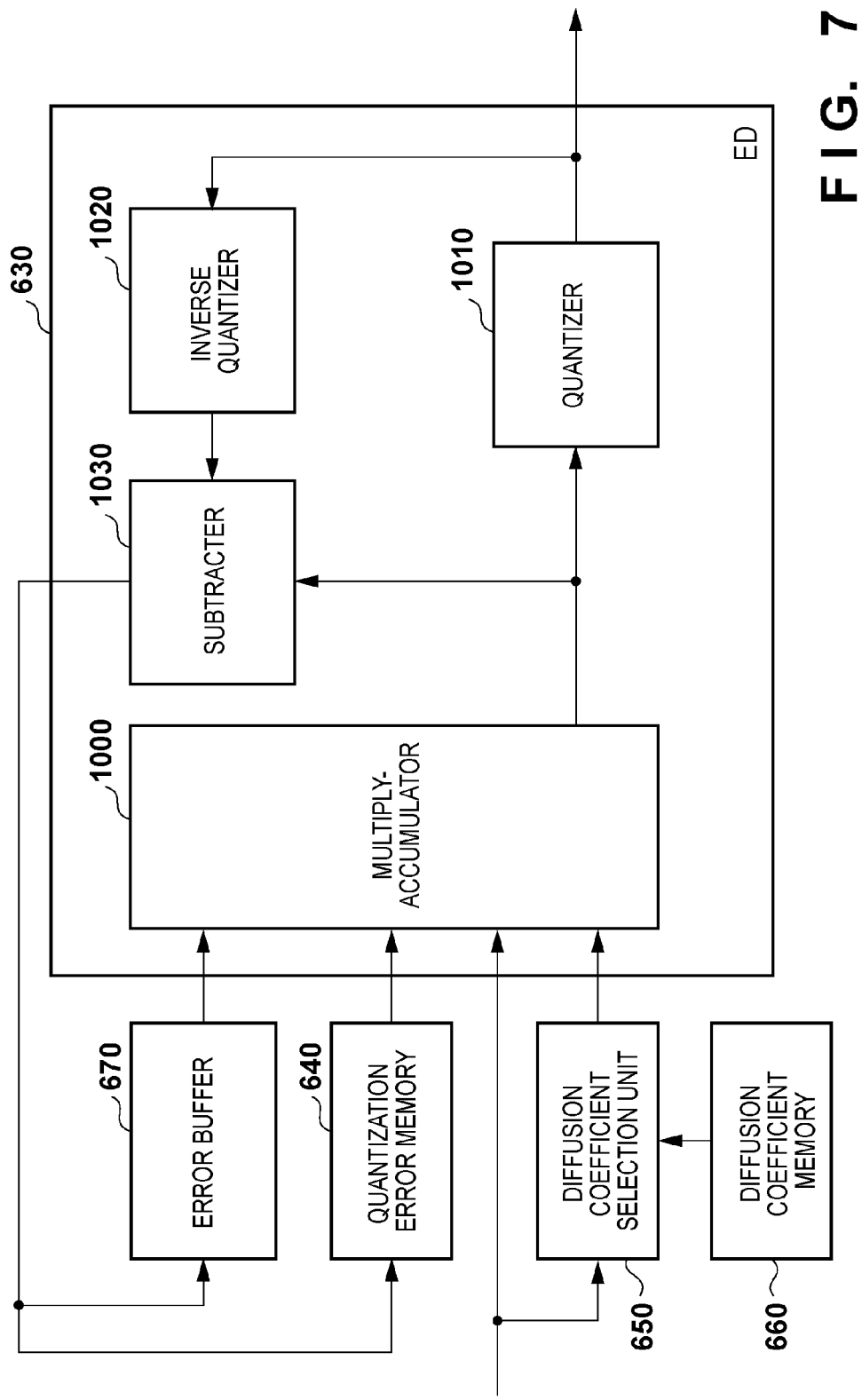
FIG. 7 is a block diagram for explaining the arrangement of an error diffusion processing unit (ED).
Figure 8:
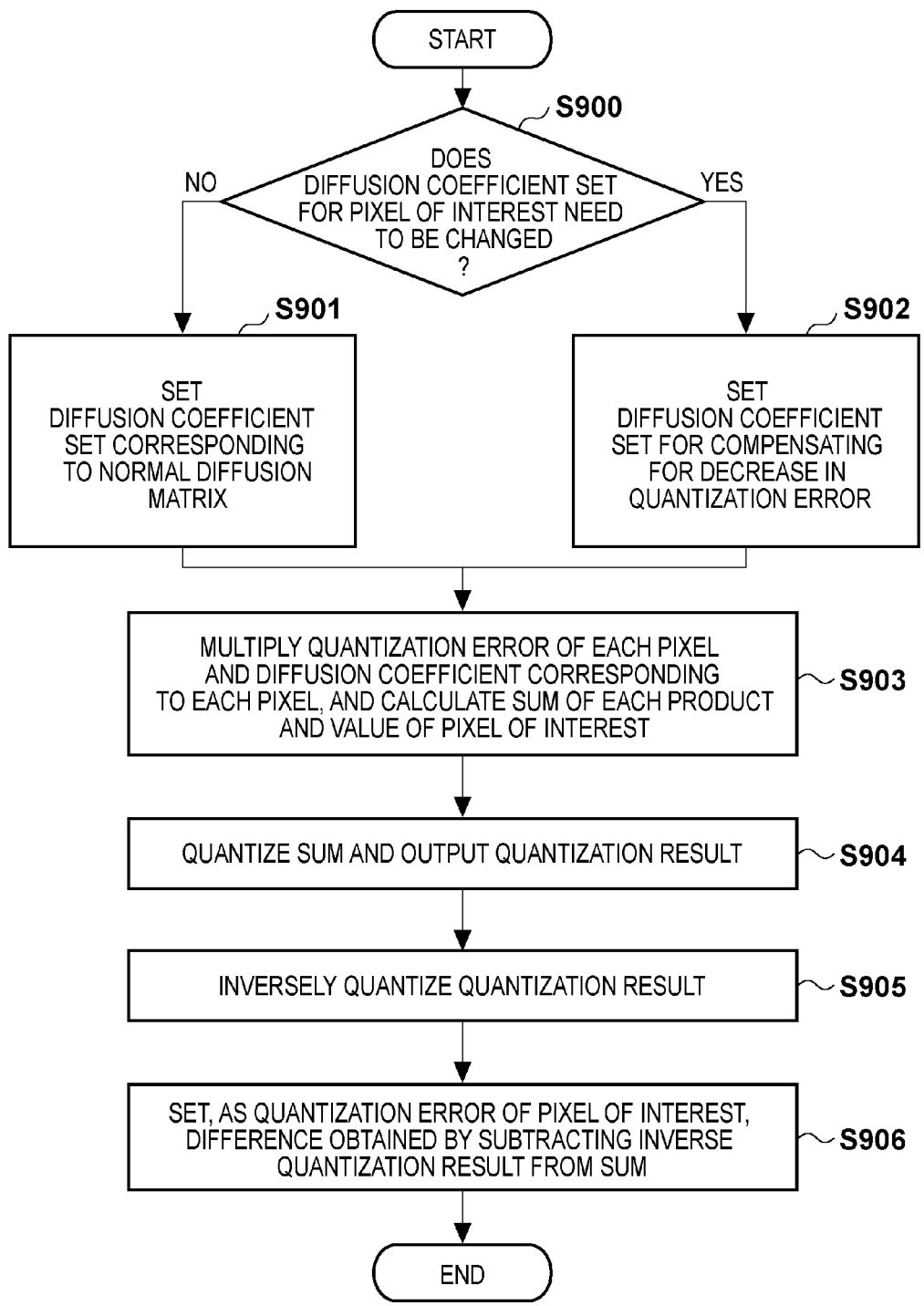
FIG. 8 is a flowchart for explaining error diffusion processing for one pixel by the error diffusion processing unit (ED).

The arrangement of the error diffusion processing unit (ED) 630 will be explained with reference to the block diagram of FIG. 7. Error diffusion processing (step S702) for one pixel by the error diffusion processing unit (ED) 630 will be explained with reference to the flowchart of FIG. 8. For example, the error diffusion processing unit (ED) 630 receives image data of 8 bits for each of C, M, Y, and K, and outputs image data of 1 bit for each of C, M, Y, and K.

The diffusion coefficient selection unit 650 determines whether the diffusion coefficient set for the pixel of interest needs to be changed (step S900). If no diffusion coefficient set need be changed, the diffusion coefficient selection unit 650 reads out a diffusion coefficient set corresponding to a normal error diffusion matrix (for example, FIG. 2A or 2B) from the diffusion coefficient memory 660. The diffusion coefficient selection unit 650 sets the diffusion coefficient set in a multiply-accumulator 1000 (step S901). If the diffusion coefficient set needs to be changed, the diffusion coefficient selection unit 650 sets, in the multiply-accumulator 1000, a diffusion coefficient set (to be described later) read out from the diffusion coefficient memory 660 (step S902).

Region division cancels a quantization error which is spread (diffused) from the next region to the region of interest. Thus, using the error diffusion matrices shown in FIGS. 2A and 2B reduces a quantization error which is diffused to pixels on boundary lines L3 and L7 shown in FIG. 6. The quantization error diffusion amount will be explained with reference to FIGS. 9A to 9D.

Figure 9A:
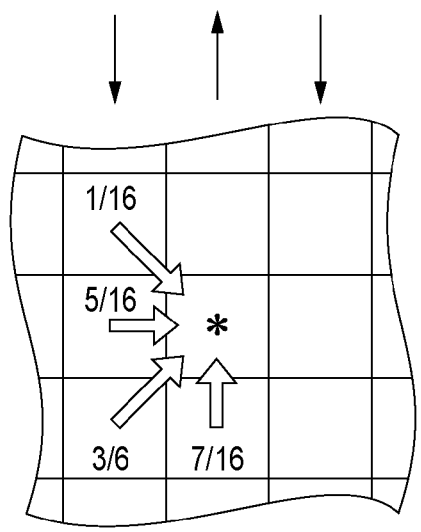
FIGS. 9A to 9D are views for explaining the quantization error diffusion amount.
Figure 9B:
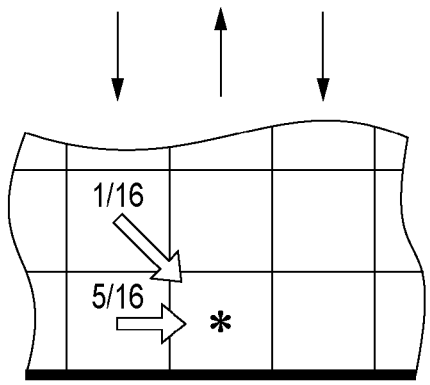
Figure 9C:
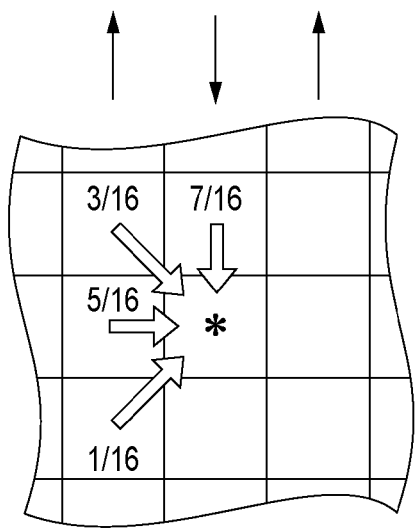
Figure 9D:
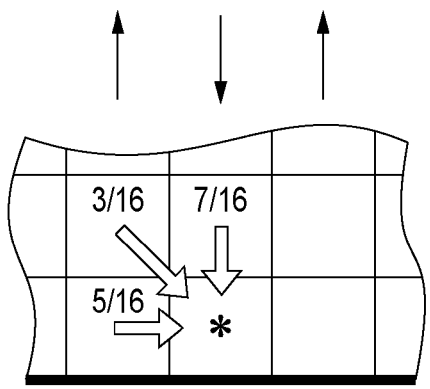

FIG. 9A shows quantization errors diffused to the pixel of interest on an even-numbered row. Quantization errors are diffused from three pixels a, b, and c on the left row and pixel e on the lower line at ratios of $1/16$, $5/16$, $3/16$, and $7/16$, respectively. FIG. 9B shows quantization errors diffused to the pixel of interest on an even-numbered row on a boundary line. Quantization errors are diffused from two pixels a and b on the left row at ratios of $1/16$ and $5/16$, respectively. FIG. 9C shows quantization errors diffused to the pixel of interest on an odd-numbered row. Quantization errors are diffused from three pixels a, b, and c on the left row and pixel d on the upper line at ratios of $3/16$, $5/16$, $1/16$, and $7/16$, respectively. FIG. 9D shows quantization errors diffused to the pixel of interest on an odd-numbered row on a boundary line. Quantization errors are diffused from two pixels a and b on the left row and pixel d on the upper line at ratios of $3/16$, $5/16$, and $7/16$, respectively. Note that a pixel on the boundary line on the first row of each region does not have a pixel on the left row, a quantization error is diffused from only pixel d on the upper line, and thus no diffused quantization error decreases.

More specifically, a boundary line includes pixels (to be referred to as pixels of the first type) on even-numbered rows for which diffused quantization errors decrease greatly, and pixels (to be referred to as pixels of the second type) on odd-numbered rows (except for the first row) for which diffused quantization errors decrease slightly. Depending on an error diffusion matrix used normally, pixels of the first type are not always pixels on an even-numbered row on a boundary line, and pixels of the second type are not always pixels on an odd-numbered row on a boundary line.

From this, diffusion coefficient sets for correcting pixels of the first and second types are prepared. When a pixel of the first type is a pixel on an even-numbered row on a boundary line, diffusion source pixels are pixels a and b on the left row, as described above. To increase quantization errors to be diffused from pixels a and b, diffusion coefficients by which the quantization errors of pixels a and b are multiplied are increased (for example, $1/16 \rightarrow 6/16$, $5/16 \rightarrow 10/16$), compensating for the decrease in diffused quantization errors.

When a pixel of the second type is a pixel on an odd-numbered row on a boundary line, diffusion source pixels are pixels a and b on the left row and pixel d on the upper line, as described above. Only a $1/16$ quantization error from pixel c decreases, so not all diffusion coefficients corresponding to all the diffusion source pixels need be increased. For example, to increase a quantization error to be diffused from pixel b, a diffusion coefficient by which the quantization error of pixel b is multiplied is increased (for example, $5/16 \rightarrow 6/16$), compensating for the decrease in diffused quantization errors.

The multiply-accumulator 1000 multiplies the quantization errors of respective pixels that have been read out from the error buffer 670 and quantization error memory 640 or the quantization error memory 640, and diffusion coefficients corresponding to the respective pixels, and calculates the sum of the products and the value of the pixel of interest (step S903). A quantizer 1010 quantizes an output from the multiply-accumulator 1000 using a predetermined threshold, and outputs the quantization result of the pixel of interest (step S904). An inverse quantizer 1020 inversely quantizes the quantization result of the pixel of interest (step S905). A subtracter 1030 outputs, as the quantization error of the pixel of interest, a difference obtained by subtracting the output of the inverse quantizer 1020 from the output of the multiply-accumulator 1000 (step S906). As described above, the quantization error is stored in the quantization error memory 640 and if necessary, in the error buffer 670.

In this way, the error buffer 670 is arranged to allow referring to a quantization error in a previous region in error diffusion processing for the region of interest when performing error diffusion processing by reciprocally scanning a divided region. Further, diffusion coefficient sets are set for pixels of the first and second types for which the quantization error diffusion amount decreases, in order to compensate for the decrease in diffusion amount. In error diffusion processing by reciprocally scanning a divided region, a dot pattern mismatch can be prevented by approximating the values of the above-mentioned diffusion errors A and B without arranging an overlapping region.

Second Embodiment

Image processing according to the second embodiment of the present invention will be described. In the second embodiment, the same reference numerals as those in the first embodiment denote the same parts, and a detailed description thereof will not be repeated.

Region division in the second embodiment will be explained with reference to FIG. 10A. In the first embodiment, error diffusion processing is performed by reciprocally scanning each region obtained by dividing the elongated image 100 in the lateral direction (main scanning direction), as shown in FIG. 1. In the second embodiment, error diffusion processing is executed by reciprocally scanning, in order of regions 201, 202, and 203, each region obtained by dividing an elongated image 100 in the longitudinal direction (sub-scanning direction), as shown in FIG. 10A. Processing in the second embodiment is the same as that in the first embodiment except for the region division method and pixel scanning direction.

Examples of error diffusion matrices and the quantization error diffusion amount will be explained with reference to FIGS. 11A and 11B. FIG. 11A shows an error diffusion matrix when scanning a region rightward. FIG. 11B shows an error diffusion matrix when scanning a region leftward.

In FIG. 10B, pixels on rows R3 and R6 are pixels to which quantization errors in previous regions need to be diffused. In error diffusion processing for the regions 201 and 202, the quantization errors of pixels on rows R2 and R5 are stored in an error buffer 670.

In FIG. 10C, the quantization error diffusion amount decreases for pixels on boundary rows R2 and R5. As shown in FIGS. 11D to 11G, pixels on even-numbered lines scanned from right to left on boundary rows are pixels of the first type for which the quantization error diffusion amount decreases greatly. Also, pixels on odd-numbered lines scanned from left to right on boundary rows are pixels of the second type for which the quantization error diffusion amount decrease slightly. Note that a pixel on the boundary line on the first row of each region does not have a pixel on the upper row, a quantization error is diffused from only a pixel on the left line, and thus no diffused quantization error decreases.

When a pixel of the first type is a pixel on an even-numbered line on a boundary row, diffusion source pixels are pixels a and d on the upper line, as shown in FIG. 11C. To increase quantization errors to be diffused from pixels a and d, diffusion coefficients by which the quantization errors of pixels a and d are multiplied are increased (for example, $1/16 \rightarrow 6/16$, $5/16 \rightarrow 10/16$), compensating for the decrease in diffused quantization errors.

When a pixel of the second type is a pixel on an odd-numbered line on a boundary row, diffusion source pixels are pixel b on the left row and pixels a and d on the upper line. Only a $1/16$ quantization error from pixel f decreases, so not all diffusion coefficients corresponding to all the diffusion source pixels need be increased. For example, to increase a quantization error to be diffused from pixel d, a diffusion coefficient by which the quantization error of pixel d is multiplied is increased (for example, $5/16 \rightarrow 6/16$), compensating for the decrease in diffused quantization errors.

Third Embodiment

Image processing according to the third embodiment of the present invention will be described. In the third embodiment, the same reference numerals as those in the first and second embodiments denote the same parts, and a detailed description thereof will not be repeated.

Region division in the third embodiment will be explained with reference to FIGS. 12A to 12C. In the first and second embodiments, an image is divided into band-like regions, as shown in FIGS. 1 and 10A. In the third embodiment, error diffusion processing is performed by reciprocally scanning, in order of regions 301, 302, ..., 306 in the longitudinal direction, each region obtained by dividing an image 100 into tiles, as shown in FIG. 12A. Image processing in the third embodiment is the same as that in the first embodiment except for the region division method.

In FIG. 12B, pixels on row R4 and lines L4 and L8 are pixels to which quantization errors in regions (to be referred to as previous processing regions) having undergone processing need to be diffused. In error diffusion processing for the regions 301, 302, 303, 304, and 305, the quantization errors of pixels on row R3 and lines L3 and L7 are stored in an error buffer 670 in order to refer to them in error diffusion processing for a region (to be referred to as an un-processing region) to be processed after processing the region of interest.

In FIG. 12C, the quantization error diffusion amount decreases for pixels on boundary lines L3 and L7 (except for the first row). As shown in FIGS. 9A to 9D, pixels on even-numbered rows on boundary lines are pixels of the first type for which the quantization error diffusion amount decreases greatly. Also, pixels on odd-numbered rows on boundary lines are pixels of the second type for which the quantization error diffusion amount decreases slightly. It suffices to prepare, in the same manner as that in the first embodiment, diffusion coefficient sets for correcting pixels of the first and second types.

Fourth Embodiment

Image processing according to the fourth embodiment of the present invention will be described. In the fourth embodiment, the same reference numerals as those in the first to third embodiments denote the same parts, and a detailed description thereof will not be repeated.

Region division in the fourth embodiment will be explained with reference to FIGS. 13A to 13C. In the third embodiment, error diffusion processing is performed by reciprocally scanning each region obtained by dividing an image into tiles. In the fourth embodiment, error diffusion processing is done by reciprocally scanning, in order of regions 501, 502, ..., 506 in the lateral direction, each region obtained by dividing an image 100 into tiles, as shown in FIG. 13A. Image processing in the fourth embodiment is the same as that in the first embodiment except for the region division method.

In FIG. 13B, pixels on row R4 and lines L4 and L8 are pixels to which quantization errors in previous processing regions need to be diffused. In error diffusion processing for the regions 501, 502, 503, 504, and 505, the quantization errors of pixels on row R3 and lines L3 and L7 are stored in an error buffer 670 in order to refer to them in error diffusion processing for an un-processing region.

In FIG. 13C, the quantization error diffusion amount decreases for pixels on boundary row R3 (except for the first line). As shown in FIGS. 11D to 11G, pixels on even-numbered lines on boundary rows are pixels of the first type for which the quantization error diffusion amount decreases greatly. Also, pixels on odd-numbered lines on boundary rows are pixels of the second type for which the quantization error diffusion amount decreases slightly. It suffices to prepare, in the same manner as that in the second embodiment, diffusion coefficient sets for correcting pixels of the first and second types.

MODIFICATION OF EMBODIMENTS

As described above, the diffusion coefficient of a pixel of the first type is changed greatly from that of a diffusion coefficient set for another pixel. In contrast, the diffusion coefficient of a pixel of the second type is changed slightly from that of a diffusion coefficient set for another pixel. Pixels of the first and second types are repeated on a boundary line with respect to an un-processing region. Thus, the influence of the great change of the diffusion coefficient hardly appears.

To compensate for a decrease in quantization error diffusion amount, a possible arrangement increases the diffusion coefficient stepwise. A case in which diffusion coefficients by which the quantization errors of pixels a and d are multiplied are increased (in the example of the second embodiment, $1/16 \to 6/16$, $5/16 \to 10/16$), like pixels of the first type, will be examined. At this time, the diffusion coefficients by which the quantization errors of pixels a and d are multiplied change abruptly. To prevent this, the diffusion coefficients by which the quantization errors of pixels a, b, c, and d to be diffused to pixels immediately before pixels of the first type are multiplied may be set to $1/16 \to 3/16$, $5/16 \to 7/16$, $3/16 \to 1/16$, and $7/16 \to 5/16$. This can reduce the influence of a change of the diffusion coefficient set for pixels of the first type.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-188747, filed Aug. 25, 2010, which is hereby incorporated by reference herein in its entirety.

What is claimed is:

1. An image processing apparatus for performing error diffusion processing for each pixel in each region of an image divided into a plurality of regions, by scanning in both a first direction and second direction different to each other, comprising:
    a storing section, configured to hold quantization errors generated in quantization of pixels which have been quantized;
    a setting section, configured to set a diffusion coefficient set for diffusing, to a pixel of interest to be processed, a quantization error generated near the pixel of interest and held by the storing section, wherein the diffusion coefficient set is selected from a plurality of diffusion coefficient sets in accordance with a position of the pixel of interest and a scanning direction in a region of interest, and the diffusion coefficient set indicates pixels to diffuse the quantization error to the pixel of interest in pixels which have been quantized and ratios of diffusing the quantization error to the pixel of interest;
    a calculation section configured to multiply a quantization error generated in the quantization of a pixel close to the pixel of interest by a diffusion coefficient corresponding to the close pixel based on the quantization errors held by the storing section and the diffusion coefficient set by the setting section, and to calculate a sum of the multiplied value and a pixel value of the pixel of interest; and
    a quantizing section, configured to quantize the sum calculated by the calculation section as the pixel value of the pixel of interest,
    wherein a combination of the pixels to diffuse the quantization error indicated by a diffusion coefficient set selected in the first direction is different from a combination of the pixels to diffuse the quantization error indicated by a diffusion coefficient set selected in the second direction.

2. The image processing apparatus according to claim 1, wherein the storing section is configured to store a quantization error of the pixel of interest in a first memory for referring to a quantization error in the error diffusion processing for a current processing region, and to store the quantization error of the pixel of interest in a memory area corresponding to the position of the pixel of interest in a second memory for referring to a quantization error in the error diffusion processing for an un-processing region to be processed after processing the current processing region.

3. The apparatus according to claim 1, wherein the scanning direction is a direction perpendicular to a division boundary of the region.

4. The apparatus according to claim 2, wherein in a case where the pixel of interest is positioned near a boundary between the current processing region and the un-processing region, the setting section sets a first diffusion coefficient set including a diffusion coefficient for compensating for a decrease in quantization error to be spread from the un-processing region.

5. The apparatus according to claim 2, wherein in a case where the pixel of interest is positioned near a boundary between the current processing region and a previous processing region having undergone the error diffusion processing before the current processing region, the quantizing section refers to the quantization errors stored in the first memory and the second memory.

6. The apparatus according to claim 2, wherein in a case where the pixel of interest is positioned near a boundary between the current processing region and the un-processing region, the storing section stores the quantization error of the pixel of interest in the second memory.

7. A method of performing error diffusion processing for each pixel in each region of an image divided into a plurality of regions, by scanning in both a first direction and second direction different to each other, comprising:
    using a processor to perform the steps of:
    holding quantization errors generated in quantization of pixels which have been quantized;
    setting a diffusion coefficient set for diffusing, to a pixel of interest to be processed, a quantization error generated near the pixel of interest and held in the holding step, wherein the diffusion coefficient set is selected from a plurality of diffusion coefficient sets in accordance with a position of the pixel of interest and a scanning direction in a region of interest, and the diffusion coefficient set indicates pixels to diffuse the quantization error to the pixel of interest in pixels which have been quantized and ratios of diffusing the quantization error to the pixel of interest;

multiplying a quantization error generated in the quantization of a pixel close to the pixel of interest by a diffusion coefficient corresponding to the close pixel based on the quantization errors held in the holding step and the diffusion coefficient set set in the setting step;

calculating a sum of the multiplied value and a pixel value of the pixel of interest; and quantizing the sum calculated in the calculating step as the pixel value of the pixel of interest, wherein a combination of the pixels to diffuse the quantization error indicated by a diffusion coefficient set selected in the first direction is different from a combination of the pixels to diffuse the quantization error indicated by a diffusion coefficient set selected in the second direction.

8. The method according to claim 7, wherein in the holding step, a quantization error of the pixel of interest is stored in a first memory for referring to a quantization error in the error diffusion processing for a current processing region, and the quantization error of the pixel of interest in a memory area corresponding to the position of the pixel of interest is stored in a second memory for referring to a quantization error in the error diffusion processing for an un-processing region to be processed after processing the current processing region.

9. A non-transitory computer readable medium storing a computer-executable program for causing a computer to perform a method of performing error diffusion processing for each pixel in each region of an image divided into a plurality of regions, by scanning in both a first direction and second direction different to each other, the method comprising the steps of:

holding quantization errors generated in quantization of pixels which have been quantized;

setting a diffusion coefficient set for diffusing, to a pixel of interest to be processed, a quantization error generated near the pixel of interest and held in the holding step, wherein the diffusion coefficient set is selected from a plurality of diffusion coefficient sets in accordance with a position of the pixel of interest and a scanning direction in a region of interest, and the error diffusion coefficient set indicates pixels to diffuse the quantization error to the pixel of interest in pixels which have been quantized and ratios of diffusing the quantization error to the pixel of interest;

multiplying a quantization error generated in the quantization of a pixel close to the pixel of interest by a diffusion coefficient corresponding to the close pixel based on the quantization errors held in the holding step and the diffusion coefficient set set in the setting step;

calculating a sum of the multiplied value and a pixel value of the pixel of interest; and quantizing the sum calculated in the calculating step as the pixel value of the pixel of interest.

10. The non-transitory computer readable medium according to claim 9, wherein in the holding step, a quantization error of the pixel of interest is stored in a first memory for referring to a quantization error in the error diffusion processing for a current processing region, and the quantization error of the pixel of interest is stored in a memory area corresponding to the position of the pixel of interest in a second memory for referring to a quantization error in the error diffusion processing for an un-processing region to be processed after processing the current processing region.

11. An image processing apparatus for performing error diffusion processing by scanning in both a first direction and second direction different to each other, comprising:

a storing section, configured to hold quantization errors generated in quantization of pixels which have been quantized;

a setting section, configured to set a diffusion coefficient set for diffusing, to a pixel of interest to be processed, a quantization error generated near the pixel of interest and held by the storing section, wherein the diffusion coefficient set is selected from a plurality of diffusion coefficient sets in accordance with a position of the pixel of interest and a scanning direction in a region of interest, and the diffusion coefficient set indicates pixels to diffuse the quantization error to the pixel of interest in pixels which have been quantized and ratios of diffusing the quantization error to the pixel of interest;

a calculation section, configured to multiply a quantization error generated in the quantization of a pixel close to the pixel of interest by a diffusion coefficient corresponding to the close pixel based on the quantization errors held by the storing section and the diffusion coefficient set by the setting section, and to calculate a sum of the multiplied value and a pixel value of the pixel of interest; and a quantizing section, configured to quantize the sum calculated by the calculation section as the pixel value of the pixel of interest, wherein a combination of the pixels to diffuse the quantization error indicated by a diffusion coefficient set selected in the first direction is different from a combination of the pixels to diffuse the quantization error indicated by a diffusion coefficient set selected in the second direction.

12. An image processing apparatus for performing error diffusion processing for each pixel in each region of an image divided into a plurality of regions, by scanning in both a first direction and second direction different to each other, comprising:

a storing section, configured to hold quantization errors generated in quantization of pixels which have been quantized;

a setting section, configured to set a diffusion coefficient set for diffusing, to a pixel of interest to be processed, a quantization error generated near the pixel of interest, wherein the diffusion coefficient set is selected from a plurality of diffusion coefficient sets in accordance with a scanning direction in a region of interest, and the diffusion coefficient set indicates pixels to diffuse the quantization error to the pixel of interest in pixels which have been quantized and ratios of diffusing the quantization error to the pixel of interest;

a calculation section, configured to multiply a quantization error generated in the quantization of a pixel close to the pixel of interest by a diffusion coefficient corresponding to the close pixel based on the quantization errors held by the storing section and the diffusion coefficient set by the setting section, and to calculate a sum of the multiplied value and a pixel value of the pixel of interest; and a quantizing section, configured to quantize the sum calculated by the calculation section as the pixel value of the pixel of interest, wherein a combination of the pixels to diffuse the quantization error indicated by a diffusion coefficient set selected in the first direction is different from a combination of the pixels to diffuse the quantization error indicated by a diffusion coefficient set selected in the second direction.

13. A method of performing error diffusion processing by scanning in both a first direction and second direction different to each other, comprising:
using a processor to perform the steps of:
holding quantization errors generated in quantization of pixels which have been quantized;
setting a diffusion coefficient set for diffusing, to a pixel of interest to be processed, a quantization error generated near the pixel of interest and held in the holding step, wherein the diffusion coefficient set is selected from a plurality of diffusion coefficient sets in accordance with a position of the pixel of interest and a scanning direction in a region of interest, and the diffusion coefficient set indicates pixels to diffuse the quantization error to the pixel of interest in pixels which have been quantized and ratios of diffusing the quantization error to the pixel of interest;
multiplying a quantization error generated in the quantization of a pixel close to the pixel of interest by a diffusion coefficient corresponding to the close pixel based on the quantization errors held in the holding step and the diffusion coefficient set set in the setting step;
calculating a sum of the multiplied value and a pixel value of the pixel of interest; and
quantizing the sum calculated in the calculating step as the pixel value of the pixel of interest
wherein a combination of the pixels to diffuse the quantization error indicated by a diffusion coefficient set selected in the first direction is different from a combination of the pixels to diffuse the quantization error indicated by a diffusion coefficient set selected in the second direction.

14. A method of performing error diffusion processing for each pixel in each region of an image divided into a plurality of regions, by scanning in both a first direction and second direction different to each other, comprising:
using a processor to perform the steps of:
holding quantization errors generated in quantization of pixels which have been quantized;
setting a diffusion coefficient set for diffusing, to a pixel of interest to be processed, a quantization error generated near the pixel of interest and held in the holding step, wherein the diffusion coefficient set is selected from a plurality of diffusion coefficient sets in accordance with a scanning direction in a region of interest, and the diffusion coefficient set indicates pixels to diffuse the quantization error to the pixel of interest in pixels which have been quantized and ratios of diffusing the quantization error to the pixel of interest;
multiplying a quantization error generated in the quantization of a pixel close to the pixel of interest by a diffusion coefficient corresponding to the close pixel based on the quantization errors held in the holding step and the diffusion coefficient set set in the setting step;
calculating a sum of the multiplied value and a pixel value of the pixel of interest; and
quantizing the sum calculated in the calculating step as the pixel value of the pixel of interest,
wherein a combination of the pixels to diffuse the quantization error indicated by a diffusion coefficient set selected in the first direction is different from a combination of the pixels to diffuse the quantization error indicated by a diffusion coefficient set selected in the second direction.

15. The apparatus according to claim 2, wherein the setting section selects a first diffusion set in a first case where the pixel of interest is not positioned near a boundary between the current processing region and the un-processing region in the first direction, selects a second diffusion set in a second case where the pixel of interest is not positioned near the boundary in the second direction, selects a third diffusion set in a third case where the pixel of interest is positioned near the boundary in the first direction, and selects a fourth diffusion set in a fourth case where the pixel of interest is positioned near the boundary in the second direction, and
wherein the first, second, third, and fourth coefficient sets are different from each other.

16. The apparatus according to claim 15, wherein a number of the pixels to diffuse the quantization error indicated by the first coefficient set is same as a number of the pixels to diffuse the quantization error indicated by the second coefficient set, and a number of the pixels to diffuse the quantization error indicated by the third coefficient set is same as a number of the pixels to diffuse the quantization error indicated by the fourth coefficient set, and
wherein the number of the pixels in the third or fourth diffusion coefficient set is less than the number of the pixels in the first or second diffusion coefficient set.

17. The apparatus according to claim 15, wherein a sum of diffusion coefficients included in the first, second, third, or fourth diffusion coefficient set is identical.

18. The apparatus according to claim 4, wherein in a case where the pixel of interest is positioned the boundary between the current processing region and the un-processing region, the calculation section obtains the quantization error from only the first memory and multiplies the obtained quantization error by the first diffusion coefficient set, and
wherein in a case where the pixel of interest is positioned a boundary between the current processing region and a previous processing region, the calculation section obtains the quantization errors from both the first and second memories and multiplies the obtained quantization errors by a second diffusion coefficient set which is set by the setting section and is different from the first coefficient set.

* * * * *